May 26, 1936.  E. A. WICKSTROM  2,041,987
LOAD WEIGHING VEHICLE
Filed Dec. 19, 1935  3 Sheets-Sheet 1
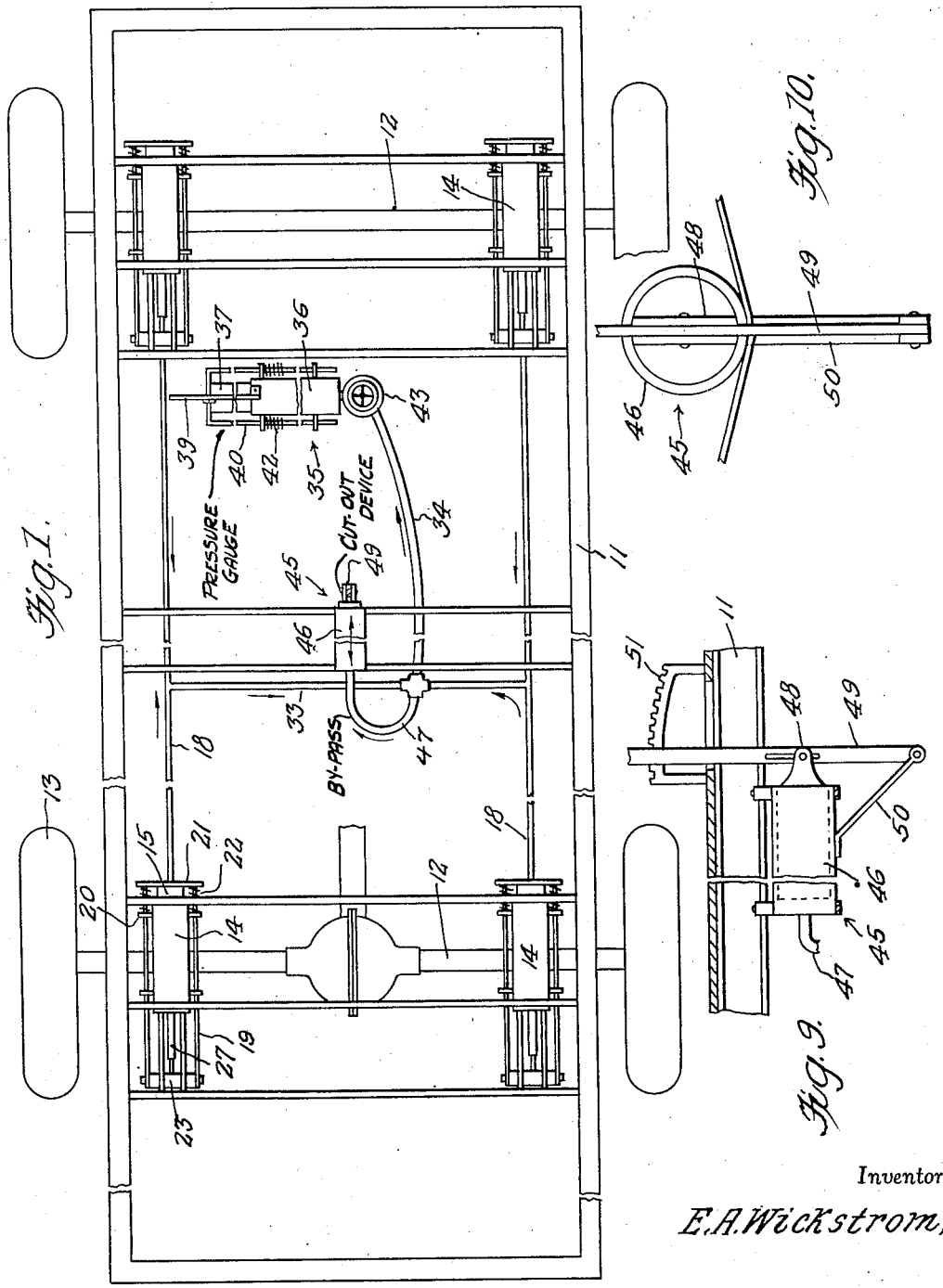
Inventor
E.A.Wickstrom,
By Clarence A. O'Brien and
Hyman Berman  Attorneys

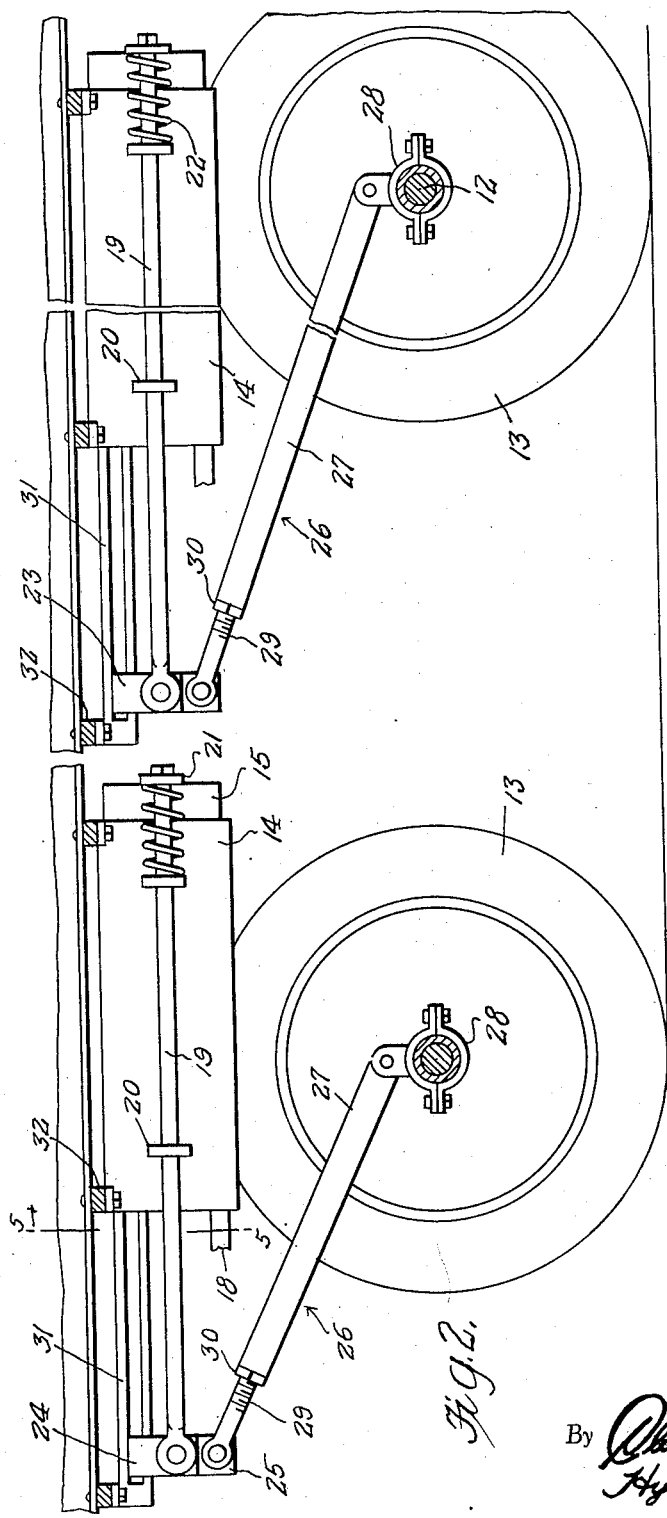
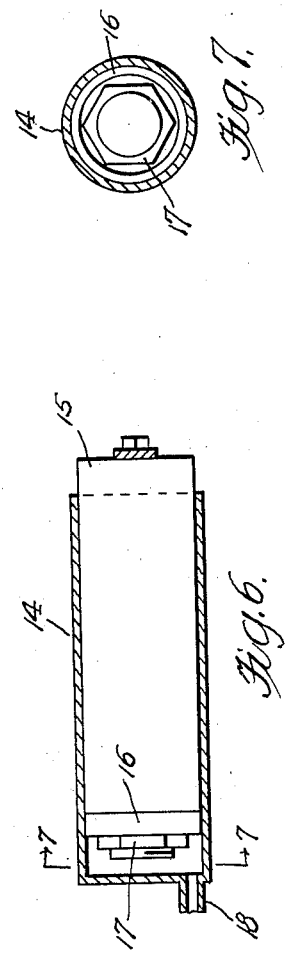

May 26, 1936.  E. A. WICKSTROM  2,041,987
LOAD WEIGHING VEHICLE
Filed Dec. 19, 1935  3 Sheets-Sheet 3
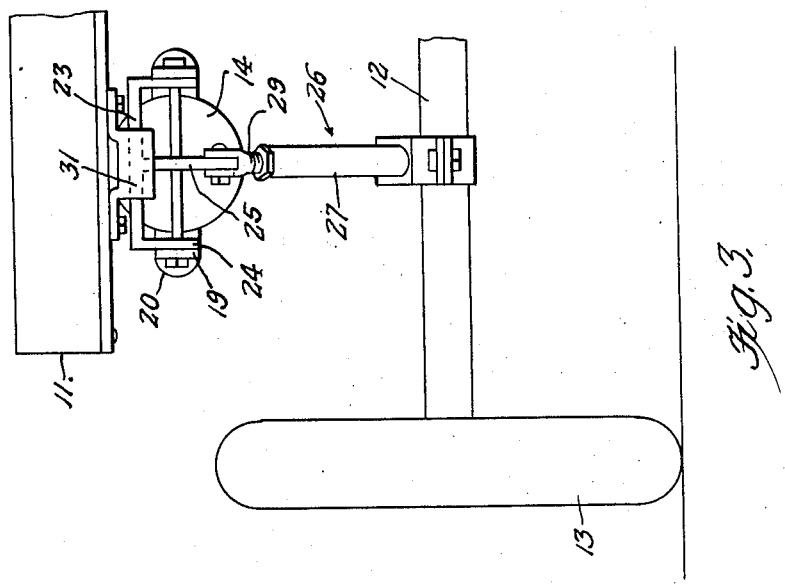
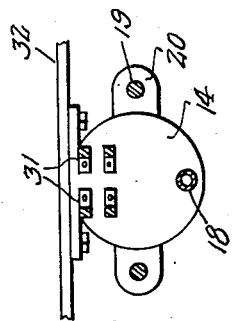
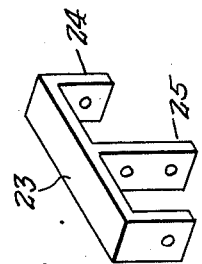
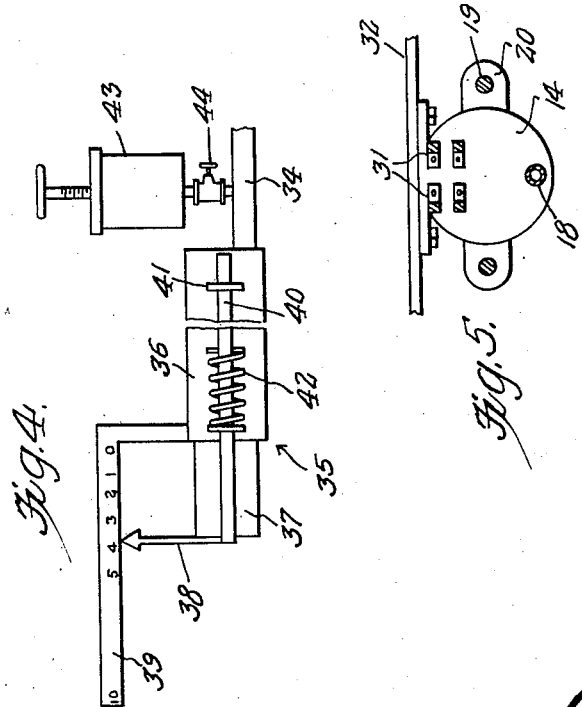
Inventor
E.A.Wickstrom,
By Clarence A.O'Brien and
Hyman Berman Attorney Patented May 26, 1936

2,041,987

UNITED STATES PATENT OFFICE 2,041,987

LOAD WEIGHING VEHICLE

Edgar Alvin Wickstrom, Superior, Wis.

Application December 19, 1935, Serial No. 55,297

4 Claims. (Cl. 265—40)

This invention relates to weighing and load measuring or gauging means of a character adapted for disposition between a spring-supported platform and wheel-equipped supporting means which structure is, fundamentally speaking, incorporated in transportation carriers, trucks and analogous conveyances.

In farming, as well as industrial areas, many different types of load-carrying conveyances are utilized. Frequently it is necessary in order to determine carrying charges, to base the charge on the weight or load carried. It follows, therefore, that the present invention has to do with readily usable and discernible gauge means susceptible of being satisfactorily used in connection with diversified forms of load carriers.

Fundamentally, the preferred embodiment of the invention contemplates the adoption and use of a simple plunger or piston actuated visible gauge arranged on the vehicle at a point of vantage, and fluid circulating and pressure means cooperable with said gauge.

As will be hereinafter learned from the succeeding descriptive matter and the accompanying illustrative drawings, novelty is predicated upon proper mechanical coordination of a group of companion fluid pumps, these being actuated at points between the platform and wheel structure and having piped connection with a simple plunger type calibrated gauge.

More explicit novelty, such as resides in the system in whole and in part will become more readily evident from the detailed description and the concluding claims.

In the accompanying drawings, wherein like numerals are employed to designate corresponding details and parts throughout the same:

Figure 1 is a diagrammatic top plan view showing a carrier vehicle chassis and underlying wheel structure and illustrating the load gauge system and structure cooperable therewith.

Figure 2 is a contracted fragmentary sectional and elevational view showing forward and rear pump assemblies and mountings.

Figure 3 is a fragmentary end elevational view of one of the so-called pump units.

Figure 4 is a side elevational view of the plunger style or type fluid actuated gauge.

Figure 5 is a sectional view which may be said to be taken approximately on the plane of the line 5—5 of Figure 2.

Figure 6 is a detail view of one of the piston and cylinder pumps.

Figure 7 is a cross-sectional view on the line 7—7 of Figure 6.

Figure 8 is a perspective view of one of the details hereinafter referred to as the reciprocatory cross-head.

Figure 9 is a side view of the fluid by-passing cut-out device.

Figure 10 is an end view of Figure 9 observing it in the direction from right to left.

In the drawings the platform or body of the carrier vehicle or conveyance is denoted unitarily by the numeral 11. The axles therebeneath are indicated at 12 and the conventional wheels at 13. These are joined together with the customary spring-suspension means (not shown). The fluid accommodation and circulating pump units are interposed between the platform and axles. It is preferred to have one pump for each wheel therefor making a uniform series of four pumps in the make-up to insure effective and uniform results. Each pump unit or assembly is the same, mechanically speaking, and a description of one will suffice for all. As shown in Figure 6 the pump includes a cylinder 14 to accommodate a reciprocatory plunger or piston 15, this having internal packing means 16 and adjusting means for the packing as indicated at 17. The fluid intake and exhaust or pressure line is indicated at 18. The piston rods, of which I provide 2 in diametric relationship, are indicated by the numerals 19 and are slidable through guides 20 on the exterior of the cylinder, these being connected by cross-bars 21, serve to actuate the piston. The numeral 22 indicates coiled return springs. These spaced parallel piston rods 19 are connected with a bracket or fixture which may be referred to conveniently as a cross-head 23. The cross-head is shown in Figure 8 and includes down-turned ends 24 with which the piston rods have pivotal connection. Then there is a central depending operating lug 25 to which the operating connection 26 is connected. This part 26 comprises a tubular member or link 27 pivotally attached to a clamp 28 which surrounds the axle, or axle housing as the case may be. A compensating rod 29 having a threaded-abutment nut, for adjustment purposes, as at 30, fits telescopically and slidably into the tube 27. This is to take care of the required extension action necessary when riding over rough surface. In other words, these two parts 27 and 29 form a flexible and adjustable operating connection between the axle and slidable cross-head 23. The cross-head slides between the track bars 31 associated with the cylinder assembly. The track and the cylinder may be appropriately supported on hanger members or strips 32 suitably fastened to the under-side of the body or platform.

As before stated, I provide four of these axle-operated pump units, there being one for each wheel. The pipe lines from the respective pumps connect up with a master pipe 33 to insure even or uniform circulation and the latter line has operating connection by way of the main circulating pipe 34 with the gauge structure 35. This gauge may be mounted at any appropriate point above the platform so that it may be easily and readily inspected. The preferred embodiment thereof is shown in Figure 4. In this figure, it will be observed that the structure includes a cylinder 36 to accommodate a plunger 37, the plunger carrying an indicator or pointer 38 for co-operation with the graduations on the L-shaped gauge arm 39 carried by the cylinder. The numeral 40 merely designates a guide and stabilizing rod for the plunger, these being slidably mounted in guide ears 41. Here, again, I utilize an expansion return spring 42 which normally keeps the plunger retracted but allows it to project under the action of fluid coming into the cylinder through the pressure or supply line 34. The entire system is filled with fluid oil, such as for example an appropriate brake fluid. Under most conditions a reserve reservoir, such as indicated at 43, will be employed, and this may have valved connection as at 44 with the pipe line 34.

The numeral 45 (see Figures 9 and 10) designates a manually controlled cut-out unit or device. This is in the form of an appropriately supported cylinder 46 of a capacity to accommodate sufficient of the fluid to render the gauge ineffective when the system is not in use. This cylinder 46 is provided with a by-pass pipe 47 having proper communicating connection with the cross-pipe in the main circulating line, that is, the cross-pipe 33, the latter pipe being in turn connected through the instrumentality of the pipe 34 with the pressure-measuring gauge. The cylinder has a suction plunger 48 mounted therein and this is operated by a lever 49 pivotally supported as at 50 and cooperable with ball and ratchet means (not shown) which is in turn engageable with a stationary rack 51. By operating the lever and sucking the fluid into the cylinder, sufficient of the fluid disappears from the main system to render it temporarily inactive as is evident.

It is thought that persons skilled in the art to which the invention relates will be able to obtain a clear understanding of the invention after considering the description in connection with the drawings. Therefore, a more lengthy description is regarded as unnecessary.

Minor changes in shape, size and the arrangement of details coming within the field of invention claimed may be resorted to in actual practice, if desired.

I claim:

1. In a structure of the class described, in combination, a carrier platform, a wheel-supported axle therebeneath, a pump including a cylinder and piston mounted beneath the platform and above the axle, said piston having an operating rod, an adjustable operating connection between the axle and operating rod, a fluid pressure controlled gauge and a fluid line connecting said gauge with said cylinder, together with a cut-out device cooperable with the gauge by way of a by-pass connection, said cut-out device including a cylinder, a suction plunger mounted therein, a lever for actuating the plunger and retaining means for the lever.

2. In a structure of the class described, in combination, a carrier platform, forward and rear wheel-supported axle assemblies arranged beneath said platform, a fluid circulating pump attached to the underside of the platform adjacent each wheel, simultaneously operable individual operating connections between the axles and respective pumps, a fluid-actuated gauge including a piston and cylinder arrangement, and communicating pipe line connections between the cylinder of the gauge and the respective pumps, together with a cut-out device for manual system-release purposes including a cylinder, a plunger in said cylinder, a by-pass connection between the cylinder and gauge, a lever for operating the plunger and retaining means on the platform with which the lever is cooperable.

3. In a structure of the class described, in combination, a carrier platform, a wheel supported axle therebeneath, a pump including a cylinder and piston mounted beneath the platform and above the axle, said piston having an operating rod, an adjustable operating connection between the axle and operating rod, a fluid pressure controlled gauge, a fluid line connecting said gauge with said pump cylinder, a cut-out device, a by-pass connection between said cut-out device and gauge, and manually actuated and controlled means for regulating said cut-out device.

4. In a structure of the class described, a fluid pressure developing and circulating pump including a cylinder, horizontal rigidly mounted guide track means connected with the cylinder, a cross-head slidable back and forth in said track means, a piston mounted for reciprocation in said cylinder, a pair of reciprocating rods slidably mounted on the cylinder and connected with said piston to actuate it, said rods being also connected to said cross-head, and axle anchored and connecting means including adjustable telescopically connected sections, one section being adapted for connection with the axle and the other section with said cross-head in the manner and for the purposes described.

EDGAR ALVIN WICKSTROM.